United States Patent
Ma et al.

(10) Patent No.: US 9,096,727 B2
(45) Date of Patent: Aug. 4, 2015

(54) PROCESS FOR MAKING LOW COMPRESSION AND HIGH AIRFLOW MDI VISCOELASTIC POLYURETHANE FOAM

(75) Inventors: Hongming Ma, Lake Jackson, TX (US); Kaoru Aou, Lake Jackson, TX (US); Rogelio R. Gamboa, Brazoria, TX (US); Carola Rosenthal, Au (CH); Randal Autenrieth, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/812,432

(22) PCT Filed: Aug. 30, 2011

(86) PCT No.: PCT/US2011/049744
§ 371 (c)(1),
(2), (4) Date: Feb. 14, 2013

(87) PCT Pub. No.: WO2012/033674
PCT Pub. Date: Mar. 15, 2012

(65) Prior Publication Data
US 2013/0225706 A1     Aug. 29, 2013

Related U.S. Application Data

(60) Provisional application No. 61/380,639, filed on Sep. 7, 2010.

(51) Int. Cl.
| | |
|---|---|
| *C08J 9/00* | (2006.01) |
| *C08G 18/40* | (2006.01) |
| *C08G 18/48* | (2006.01) |
| *C08G 18/63* | (2006.01) |
| *C08G 101/00* | (2006.01) |

(52) U.S. Cl.
CPC .......... *C08J 9/0042* (2013.01); *C08G 18/4072* (2013.01); *C08G 18/4816* (2013.01); *C08G 18/4845* (2013.01); *C08G 18/632* (2013.01); *C08G 2101/005* (2013.01); *C08G 2101/0008* (2013.01); *C08G 2101/0083* (2013.01); *C08G 2250/00* (2013.01)

(58) Field of Classification Search
CPC ................. C08G 18/4816; C08G 2280/00
USPC .......................................... 521/174
See application file for complete search history.

(56) References Cited

U.S. PATENT DOCUMENTS

| | | | |
|---|---|---|---|
| 5,418,261 A | 5/1995 | Helsemans et al. | |
| 6,391,935 B1 | 5/2002 | Hager et al. | |
| 6,617,369 B2 | 9/2003 | Parfondry et al. | |
| 6,946,497 B2 | 9/2005 | Yu | |
| 7,022,746 B2 | 4/2006 | Lockwood et al. | |
| 2004/0068022 A1* | 4/2004 | Katsumata | 521/170 |
| 2007/0299153 A1 | 12/2007 | Hager et al. | |
| 2009/0008595 A1 | 1/2009 | Sasaki et al. | |
| 2010/0204428 A1* | 8/2010 | Barbieri | 528/60 |
| 2011/0136930 A1 | 6/2011 | Butler et al. | |

FOREIGN PATENT DOCUMENTS

| | | | |
|---|---|---|---|
| EP | 0822209 A2 * | 2/1998 | |
| EP | 1990354 A1 | 11/2008 | |
| GB | 1381925 A | 1/1975 | |
| WO | 02055211 A1 | 7/2002 | |
| WO | 2007144272 A1 | 12/2007 | |

OTHER PUBLICATIONS

Machine translation of ES 2404734 to Sobrino et al. obtained from the European Patent Office, Apr. 2014.*
PCT/US2011/049744, International Search Report and Written Opinion.
PCT/US2011/049744, International Preliminary Report on Patentability.

* cited by examiner

*Primary Examiner* — Melissa Rioja

(57) ABSTRACT

A reaction system comprising an organic polyisocyanate and an isocyanate reactive component for preparation of a viscoelastic polyurethane foam is provided. The isocyanate reactive component comprises (i) from 10 to 50% by weight of one or more low equivalent weight propylene oxide rich (PO-rich) polyols having a combined number average equivalent weight from 200 to 500, (ii) from 45 to 95% by weight of one or more ethylene oxide (EO-rich) polyols having a combined number average equivalent weight from 200 to 800 and an ethylene oxide content from 40% to 65% by weight of the total mass of the EO-rich polyol and at least one of (iii) from 10 to 30% by weight of one or more high equivalent weight PO-rich polyols having a number average equivalent weight from 800 to 2,000 or (iv) from 10 to 40% by weight of one or more propylene oxide co-polymer polyols containing styrene-acrylonitrile.

19 Claims, No Drawings

PROCESS FOR MAKING LOW COMPRESSION AND HIGH AIRFLOW MDI VISCOELASTIC POLYURETHANE FOAM

BACKGROUND OF THE INVENTION

1. Field of the Invention

Embodiments of the present invention relate to polyurethane foams. More particularly, embodiments of the present invention relate to polyurethane foams having viscoelastic properties.

2. Description of the Related Art

Polyurethane foams are used in a wide variety of applications, ranging from cushioning (such as mattresses, pillows and seat cushions) to packaging to thermal insulation and for medical applications. Polyurethanes have the ability to be tailored to particular applications through the selection of the raw materials that are used to form the polymer.

One class of polyurethane foam is known as viscoelastic (VE) or "memory" foam. Viscoelastic foams exhibit a time-delayed and rate-dependent response to an applied stress. They have low resiliency and recover slowly when compressed. These properties are often associated with the glass transition temperature (Tg) of the polyurethane. Viscoelasticity is often manifested when the polymer has a Tg at or near the use temperature, which is room temperature for many applications.

Like most polyurethane foams, VE polyurethane foams are prepared by the reaction of a polyol component with a polyisocyanate in the presence of a blowing agent. The blowing agent is usually water or a mixture of water and another material. VE formulations are often characterized by the selection of polyol component and the amount of water in the formulation. The predominant polyol used in these formulations has a functionality of about 3 hydroxyl groups/molecule and a molecular weight in the range of 400-1500. This polyol is primarily the principal determinant of the Tg of the polyurethane foam, although other factors such as water levels and isocyanate index also play significant roles.

Typically, viscoelastic polyurethane foams have low air flow properties, generally less than about 1.0 standard cubic feet per minute (scfm) (0.47 liters/second) under conditions of room temperature (22° C.) and atmospheric pressure (1 atm), therefore promoting sweating when used as comfort foams (for instance, bedding, seating and other cushioning). Low air flow also leads to low heat and moisture transfer out of the foam resulting in (1) increased foam (bed) temperature and (2) moisture level. The consequence of higher temperature is higher resiliency and lowered viscoelastic character. Combined heat and moisture result in accelerated fatigue of the foam. In addition, if foam air flows are sufficiently low, foams can suffer from shrinkage during manufacturing. Furthermore, improving the support factor of viscoelastic foams is limited unless viscoelastic properties are compromised.

High air flow may be obtained at the sacrifice of other physical properties such as compression set and tear. Low compression set is critical for foam recovery from tight packing during storage and transportation and reflects long term durability of foam articles such as mattresses and pillows.

It would be desirable to achieve a higher air flow value than is generally now achieved while retaining viscoelastic properties of the foam. Furthermore, it would be desirable to have foams with improved air flow while retaining properties such as compression set. In some applications, it is also desirable to have foams which feel soft to the touch.

SUMMARY OF THE INVENTION

Embodiments of the present invention relate to polyurethane foams. More particularly, embodiments of the present invention relate to polyurethane foams having high air flow while maintaining viscoelastic properties.

In one embodiment, a reaction system for preparation of viscoelastic polyurethane foam is provided. The reaction system comprises (a) an organic polyisocyanate and (b) an isocyanate reactive component. The isocyanate reactive component comprises (i) from 10 to 50% by weight of the isocyanate reactive component of one or more low equivalent weight propylene oxide rich (PO-rich) polyols having a combined number average equivalent weight from 200 to 500, (ii) from 45 to 95% by weight of the isocyanate reactive component of one or more ethylene oxide (EO-rich) polyols having a combined number average equivalent weight from 200 to 800 and an ethylene oxide content from 30% to 75% by weight of the total mass of the EO-rich polyol and at least one of (iii) from 10 to 30% by weight of the isocyanate reactive component of one or more high equivalent weight PO-rich polyols having a number average equivalent weight from 800 to 2,000 and (iv) from 10 to 40% by weight of the isocyanate reactive component of one or more propylene oxide co-polymer polyols containing styrene-acrylonitrile.

In another embodiment, a method of preparing viscoelastic foam is provided. The method comprises forming reaction components and combining the reaction components at conditions sufficient to form a viscoelastic polyurethane foam. The reaction components comprise an organic polyisocyanate, an isocyanate reactive component, water, and a catalyst component. The isocyanate reactive component comprises one or more low equivalent weight propylene oxide rich (PO-rich) polyols having a combined number average equivalent weight from 200 to 500 comprising from 10 to 50% by weight of the isocyanate reactive component, one or more ethylene oxide (EO-rich) polyols having a combined number average equivalent weight from 200 to 800 and an ethylene oxide content from 40% to 65% by weight of the total mass of the EO-rich polyol comprising from 45 to 95% by weight of the isocyanate reactive component, and at least one of: (i) one or more high equivalent weight PO-rich polyols having a number average equivalent weight from 800 to 2,000 comprising from 10 to 30% by weight of the isocyanate reactive component, and (ii) one or more propylene oxide co-polymer polyols containing styrene-acrylonitrile from 10 to 40% by weight of the isocyanate reactive component.

In yet another embodiment, a reaction system for preparation of a viscoelastic polyurethane foam is provided. The reaction system comprises (a) an organic polyisocyanate, (b) an isocyanate reactive component, and (c) an organosilicone surfactant. The isocyanate reactive component comprises ((b)(i)) from 70% to 95% by weight of the isocyanate reactive component of one or more ethylene oxide (EO-rich) polyols having a combined number average equivalent weight from 200 to 800 and an ethylene oxide content from 40% to 65% by weight of the total mass of the EO-rich polyol and ((b)(ii)) from 10% to 30% by weight of the isocyanate reactive component of one or more high equivalent weight propylene oxide rich (PO-rich) polyols having a number average equivalent weight from 800 to 2,000.

DETAILED DESCRIPTION

Embodiments of the present invention relate to polyurethane foams. More particularly, embodiments of the present invention relate to polyurethane foams having high air flow while maintaining viscoelastic properties.

As used herein, the term "air flow" refers to the volume of air which passes through a 1.0 inch (2.54 cm) thick 2 inch×2 inch (5.08 cm) square section of foam at 125 Pa (0.018 psi) of pressure. Units are expressed in cubic decimeters per second (i.e. liters per second) and converted to standard cubic feet per minute. A representative commercial unit for measuring air flow is manufactured by TexTest AG of Zurich, Switzerland and identified as TexTest Fx3300. This measurement follows ASTM D 3574 Test G.

As used herein, the term "CFD 25%" refers to a compression force deflection measurement where a foam 4×4 inches in the lateral direction and 2 inches thick (10.16×10.16×5.08 cm) is compressed down in the thickness-axis to a compression strain of 25%, and held for one minute before the compression force deflection measurement is determined, i.e., the foam is compressed to 75%, of its original thickness, according to the procedures of ASTM D 3574 C and is measured in pounds force (lbf), newtons (N), or kilopascals (kPa). "CFD 40%", "CFD 65%" and "CFD 75%" similarly corresponds to a compression to 60%, 35% and 25% of the original foam thickness, respectively.

As used herein, the term "Compression Set @ 90%" stands for compression set test measured at the 90% compressive deformation level and parallel to the rise direction in the foam. This test is used herein to correlate in-service loss of cushion thickness and changes in foam hardness. The compression set is determined according to the procedures of ASTM D 3574-95, Test I, and is measured as percentage of original thickness of the sample.

As used herein, the term "density" is used herein to refer to weight per unit volume of a foam. In the case of viscoelastic polyurethane foams the density is determined according to the procedures of ASTM D357401, Test A. Advantageously, the viscoelastic foam has a density of at least about 2.5, preferably at least about 3, more preferably at least about 4 and preferably at most about 8, more preferably at most about 6, most preferably at most about 5.5 pounds/ft$^3$ (40, 48, 64, 128, 96, 88 kg/m$^3$, respectively).

As used herein, the term "elongation %" as applied to a foam is used herein to refer to the linear extension which a sample of foam can attain before rupture. The foam is tested by the same method used to determine tensile strength, and the result is expressed as a percentage of the original length of the foam sample according to the procedures of ASTM D-3574, Test E.

As used herein, the term "functionality" particularly "polyol functionality" is used herein to refer to the number of active hydrogens on an initiator, used to prepare the polyol, that can react with an epoxide molecule (such as ethylene oxide or propylene oxide). This is also referred to as nominal functionality. For the purpose of polyol functionality, any primary/secondary amine or hydroxyl functionality will count once toward the nominal functionality value.

As used herein, the term "Indentation Force Deflection" (IFD) is a measure of load bearing and is expressed in Newtons or pound-force (lbf). As used herein, the term "25% IFD" refers to a measure of the force required to make a dent 1 inch (25% of the thickness) into a foam sample 15"×15"×4" by an 8 inch diameter (50 in$^2$) disc. The testing device records the force in pounds required to hold the foam indenter after one minute. As used herein, the term "65% IFD" refers to the force required to make a dent 65% of the thickness into a foam sample 15"×15"×4" by an 8 inch diameter (50 in$^2$) disc.

As used herein, the term "VE Recovery Time" or "Recovery Time", is measured by releasing/returning the compression load head from the VE 75% position (foam compression to 25% of original foam thickness) to the position where foam compression is to 90% of original foam thickness. The Recovery Time is defined as the time from releasing/returning the compression load head to the moment that the foam pushes back against the load head with a force of at least one Newton. The Recovery Time is determined according to the procedures of ASTM D-3574M and is measured in seconds. For a viscoelastic foam this time is desirably at least about 2 seconds, preferably at least about 5 seconds and most preferably at least about 6 seconds, but advantageously less than about 30 seconds and preferably less than about 20 seconds. This is one measure of the "shape memory effect" although it is not absolute, since one can get a low number on the Recovery Time and still have a "shape memory foam As used herein, the term "resiliency" is used to refer to the quality of a foam perceived as springiness. It is measured according to the procedures of ASTM D3574 Test H. This ball rebound test measures the height a dropped steel ball of known weight rebounds from the surface of the foam when dropped under specified conditions and expresses the result as a percentage of the original drop height. As measured according to the ASTM test, a cured VE foam exhibits a resiliency of advantageously at most about 20%, preferably at most about 10%.

As used herein, the term "support factor" refers to the ratio of 65% Compression Force Deflection (CFD) divided by 25% Compression Force Deflection.

As used herein, the term "tear strength" is used herein to refer to the maximum average force required to tear a foam sample which is pre-notched with a slit cut lengthwise into the foam sample. The test results are determined according to the procedures of ASTM D3574-F in pounds per linear inch (lb/in) or in newtons per meter (N/m).

As used herein, the term "viscoelastic foam" is intended to designate those foams having a resilience of less than 25%, as measured according to ASTM D3574 Test H. Preferably the foam will have a resilience of less than 20%. In certain embodiments the foam will have a resilience of less than 15% or even less than 10%.

The isocyanate-reactive components used in polyurethane production are generally those compounds having at least two hydroxyl groups. Those compounds are referred to herein as polyols. The polyols include those obtained by the alkoxylation of suitable starting molecules (initiators) with an alkylene oxide. Examples of initiator molecules having 2 to 4 reactive sites include water, ammonia, or polyhydric alcohols such as dihydric alcohols having a molecular weight from 62 to 399, especially the alkane polyols such as ethylene glycol, propylene glycol, hexamethylene diol, glycerol, trimethylol propane or trimethylol ethane, or low molecular weight alcohols containing ether groups such as diethylene glycol, triethylene glycol, dipropylene glycol, tripropylene glycol or butylene glycols. These polyols are conventional materials prepared by conventional methods. For polyols, when the term "triol" or "monol" is used, the functionality of the starting initiator (such as glycerin for triols and n-butanol for monols) is intended. Catalysis for this polymerization can be either anionic or cationic, with catalysts such as potassium hydroxide (KOH), cesium hydroxide (CsOH), boron trifluoride, or a double metal cyanide complex (DMC) catalyst such as zinc hexacyanocobaltate or quaternary phosphazenium compound. In the case of alkaline catalysts, these alkaline catalysts are preferably removed from the polyol at the end of production by a proper finishing step, such as coalescence, magnesium silicate separation or acid neutralization.

In one embodiment, a reaction system for preparation of a viscoelastic polyurethane foam is provided. The reaction system comprises (a) one or more methylene diphenyl diisocyanate (MDI) based components and (b) an isocyanate reactive component. In certain embodiments, the reaction system further comprises (c) one or more blowing agents. In certain embodiments, the reaction system further comprises (d) one or more catalyst components. In certain embodiments, the reaction system further comprises (e) one or more surfactants. In certain embodiments, the reaction system further comprises additional additives.

Component (a) may comprise one or more organic polyisocyanate components having an average of 1.8 or more isocyanate groups per molecule. The isocyanate functionality is preferably from about 1.9 to 4, and more preferably from 1.9 to 3.5 and especially from 2.0 to 3.3.

The one or more organic polyisocyanate components may be a polymeric polyisocyanate, aromatic isocyanate, cycloaliphatic isocyanate, or aliphatic isocyanate. Exemplary polyisocyanates include m-phenylene diisocyanate, tolulene-2,4-diisocyanate, tolulene-2,6-diisocyanate, hexamethylene-1,6-diisocyanate, tetramethylene-1,4-diisocyanate, cyclohexane-1,4-diisocyanate, hexahydrotoluene diisocyanate, naphthylene-1,5-diisocyanate, methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, a polymethylene polyphenylisocyanate (PMDI), toluene-2,4,6-triisocyanate and 4,4'-dimethyldiphenylmethane-2,2',5,5'-tetraisocyanate. Preferred polyisocyanates include MDI and derivatives of MDI such as biuret modified "liquid" MDI products and polymeric MDI. Preferred polyisocyanates are the so-called polymeric MDI products, which are a mixture of polymethylene polyphenylene polyisocyanates in monomeric MDI. In one embodiment, the polymeric MDI comprises 70 wt. % or more of the total isocyanate. Especially suitable polymeric MDI products have a free MDI content of from 5 to 50% by weight, more preferably 10 to 40% by weight. Such polymeric MDI products are available from The Dow Chemical Company under the trade names PAPI® and VORANATE®.

An especially preferred polyisocyanate is a polymeric MDI product having an average isocyanate functionality of from 2.3 to 3.3 isocyanate groups/molecule and an isocyanate equivalent weight from 120 to 170, preferably from 125 to 135. Suitable commercially available products of that type include PAPI™ PB-219, PAPI™ 27, Voranate™ M229, Voranate™ 220, Voranate™ 290, Voranate™ M595 and Voranate™ M600, all of which are available from The Dow Chemical Company.

The amount of polyisocyanate that is used typically is sufficient to provide an isocyanate index of from 55 to 110. In yet another embodiment the index is from 60 to 110. In yet another embodiment the index is from 70 to 100 and in a further embodiment from 75 to 90.

Component (b) may be an isocyanate reactive component comprising (i) from 10 to 50% by weight of the isocyanate reactive component of one or more low equivalent weight propylene oxide rich (PO-rich) polyols having a combined number average equivalent weight from 200 to 500, (ii) from 50 to 95% by weight of the isocyanate reactive component of one or more ethylene oxide (EO-rich) polyols having a combined number average equivalent weight from 200 to 800 and an ethylene oxide content equal to or greater than 30% but less than 70% of the total mass of the EO-rich polyol, and either (iii) from 10 to 30% by weight of the isocyanate reactive component of one or more high equivalent weight PO-rich polyols having a number average equivalent weight from 800 to 2,000, or (iv) from 10 to 40% by weight of the isocyanate reactive component of one or more propylene oxide co-polymer polyols containing styrene-acrylonitrile. In certain embodiments, the isocyanate reactive component (b) further comprises (v) from 5 to 10% by weight of the isocyanate reactive component of one or more ethylene oxide-propylene oxide monols having a combined number average equivalent weight from 300 to 800.

In certain embodiments the low equivalent weight PO-rich polyol ((b)(i)) may comprise at least 10 wt. %, 15 wt. %, 20 wt. %, 25 wt. %, 30 wt. %, 35 wt. %, 40 wt. %, or 45 wt. % of the total isocyanate reactive component (b). In certain embodiments, the one or more low equivalent weight PO-rich polyols ((b)(i)) may comprise up to 15 wt. %, 20 wt. %, 25 wt. %, 30 wt. %, 35 wt. %, 40 wt. %, 45 wt. % or 50 wt. % of the total isocyanate reactive component (b). In certain embodiments, the one or more low equivalent weight PO-rich polyols ((b)(i)) may comprise from 10% to 50% by weight or from about 20% to 40% by weight of the total isocyanate reactive component (b).

In certain embodiments, the one or more low equivalent weight PO-rich polyols ((b)(i)) have a combined number average equivalent weight from 200 to 500. In certain embodiments, the one or more low equivalent weight PO-rich polyols ((b)(i)) have a combined number average equivalent weight from 200 to 340. In certain embodiments, the one or more low equivalent weight PO-rich polyols ((b)(i)) have a functionality between 2 and 6. In certain embodiments, the one or more low equivalent weight PO-rich polyols ((b)(i)) have a functionality between 2.2 and 4. In certain embodiments, the one or more low equivalent weight PO-rich polyols ((b)(i)) have a PO content of at least 70 wt. %, 75 wt. %, 80 wt. %, 85 wt. %, 90 wt. %, or 95 wt. % of the total mass of the low equivalent weight PO-rich polyol. In certain embodiments, the one or more low equivalent weight PO-rich polyols ((b)(i)) have a PO content of up to 75 wt. %, 80 wt. %, 85 wt. %, 90 wt. %, 95 wt. % or 100 wt. % of the total mass of the low equivalent weight PO-rich polyol. In certain embodiments, the one or more low equivalent weight PO-rich polyols ((b)(i)) will have some amount of primary hydroxyl content. In certain embodiments, the one or more low equivalent weight PO-rich polyols will have a primary hydroxyl content of 30% or greater of the total hydroxyl content of the low equivalent weight PO-rich polyol.

In certain embodiments, the one or more EO-rich polyols ((b)(ii)) may comprise at least 45 wt. %, 50 wt. %, 55 wt. %, 60 wt. %, 65 wt. %, 70 wt. %, 75 wt. %, 80 wt. %, 85 wt. % or 90 wt. % of the total isocyanate reactive component (b). In certain embodiments, the one or more EO-rich polyols ((b)(ii)) may comprise up to 50 wt. %, 55 wt. %, 60 wt. %, 65 wt. %, 70 wt. %, 75 wt. %, 80 wt. %, 85 wt. %, 90 wt. %, or 95 wt. %. The one or more EO-rich polyols ((b)(ii)) may comprise from 45 wt. % to 95 wt. % by weight or from 65 wt. % to 85 wt. % of the total isocyanate reactive component (b).

In certain embodiments, the one or more EO-rich polyols ((b)(ii)) have a combined number average equivalent weight from 200 to 800. In certain embodiments, the one or more EO-rich polyols ((b)(ii)) have a combined number average equivalent weight from 250 to 400. In certain embodiments, the one or more EO-rich polyols ((b)(ii)) have a functionality between 2 and 6. In certain embodiments, the one or more EO-rich polyols ((b)(ii)) have a functionality between 2.5 and 4. In certain embodiments, the one or more EO-rich polyols ((b)(ii)) have an EO content of at least 30 wt. %, 35 wt. %, 40 wt. %, 45 wt. %, 50 wt. %, 55 wt. %, 60 wt. %, 65 wt. %, or 70 wt. % of the total mass of the one or more EO-rich polyols. In certain embodiments, the one or more EO-rich polyols ((b)(ii)) have an EO content of up to 35 wt. %, 40 wt. %, 45 wt. %, 50 wt. %, 55 wt. %, 60 wt. %, 65 wt. %, 70 wt. %, or 75 wt. % of the total mass of the one or more EO-rich polyols. The one or more EO-rich polyols ((b)(ii)) may have an EO content greater than 30% but less than 75% of the total mass of the one or more EO-rich polyols or from 40 wt. % to 65 wt. % of the total mass of the one or more EO-rich polyols or from 50 wt. % to 60 wt. % of the total mass of the one or more EO-rich polyols. In certain embodiments, the one or more EO-rich polyols ((b)(ii) have a primary hydroxyl content of less than 50%.

In certain embodiments where molded foams are produced the one or more EO-rich polyols ((b)(ii)) may have a combined number average equivalent weight from 200 to 800, preferably from 350 to 550. In certain embodiments where molded foams are produced, the one or more EO-rich polyols ((b)(ii)) may have an EO content from 30% to 75% of the total mass of the one or more EO-rich polyols.

In certain embodiments, the one or more high equivalent weight PO-rich polyols ((b)(iii)) may comprise at least 10 wt. %, 15 wt. %, 20 wt. %, or 25 wt. % of the total isocyanate reactive component (b). In certain embodiments, the one or more high equivalent weight PO-rich polyols ((b)(iii)) may comprise up to 15 wt. %, 20 wt. %, 25 wt. %, or up to 30 wt. % of the total isocyanate reactive component (b). In certain embodiments, the one or more high equivalent weight PO-rich polyols ((b)(iii)) may comprise from 10% to 30% by weight or from about 15% to 20% by weight of the total isocyanate reactive component (b).

In certain embodiments, the one or more high equivalent weight PO-rich polyols ((b)(iii)) have a combined number average equivalent weight from 800 to 2,000. In certain embodiments, the one or more high equivalent weight PO-rich polyols ((b)(iii)) have a combined number average equivalent weight from 900 to 1,200. In certain embodiments, the one or more high equivalent weight PO-rich polyols ((b)(iii)) have a functionality between 2 and 6. In certain embodiments, the one or more high equivalent weight PO-rich polyols ((b)(iii)) have a functionality between 2.2 and 4. In certain embodiments, the one or more high equivalent weight PO-rich polyols ((b)(iii)) have a PO content of at least 70 wt. %, 75 wt. %, 80 wt. %, 85 wt. %, 90 wt. %, or 95 wt. % of the total mass of the low equivalent weight PO-rich polyol. In certain embodiments, the one or more low equivalent weight PO-rich polyols ((b)(iii)) have a PO content of up to 75 wt. %, 80 wt. %, 85 wt. %, 90 wt. %, 95 wt. % or 100 wt. % of the total mass of the low equivalent weight PO-rich polyol.

In certain embodiments, the one or more propylene oxide co-polymer polyols ((b)(iv)) may comprise at least 10 wt. %, 15 wt. %, 20 wt. %, or 25 wt. % of the total isocyanate reactive component (b). In certain embodiments, the one or more propylene oxide co-polymer polyols ((b)(iv)) may comprise up to 15 wt. %, 20 wt. %, 25 wt. %, or up to 30 wt. % of the total isocyanate reactive component (b). In certain embodiments, the one or more propylene oxide co-polymer polyols ((b)(iv)) may comprise from 10% to 30% by weight or from about 15% to 20% by weight of the total isocyanate reactive component (b).

In certain embodiments, the propylene oxide co-polymer polyol ((b)(iv)) contains dispersed polymer particles. In certain embodiments, propylene oxide co-polymer polyol ((b)(iv)) contains dispersed styrene/acrylonitrile (SAN) particles. In certain embodiments, the dispersed polymer particles are obtained by in-situ polymerization of acrylonitrile and styrene. In certain embodiments, the one or more propylene oxide co-polymer polyols ((b)(iv)) comprise from 20% to 50% solid styrene acrylonitrile. In certain embodiments, the one or more propylene oxide co-polymer polyols ((b)(iv)) comprise from 30% to 40% solid styrene acrylonitrile. In certain embodiments, the styrene acrylonitrile particles have a particle size from 1 to 2 microns. In certain embodiments, the one or more propylene-oxide polyols have a hydroxyl number of 22.

In certain embodiments, the one or more ethylene oxide-propylene oxide monols ((b)(v)) may comprise at least 1 wt. %, 5 wt. %, 10 wt. %, or 15 wt. % of the total isocyanate reactive component (b). In certain embodiments, the one or more ethylene oxide-propylene oxide monols ((b)(v)) may comprise up to 5 wt. %, 10 wt. %, 15 wt. %, or 20 wt. % of the total isocyanate reactive component (b). In certain embodiments, the one or ethylene oxide-propylene oxide monols ((b)(v)) may comprise from 1% to 20% by weight or from 5% to 10% by weight of the total isocyanate reactive component (b).

In certain embodiments, the one or more ethylene oxide-propylene oxide monols ((b)(v)) have an equivalent weight from 300 to 800. In certain embodiments, the one or more ethylene oxide-propylene oxide monols ((b)(v)) have an equivalent weight from 400 to 600. In certain embodiments, the one or more ethylene oxide-propylene oxide monols ((b)(v)) have a functionality between 1 and 2. In certain embodiments, the one or more ethylene oxide-propylene oxide monols ((b)(v)) have an EO content from 30-70% of the total mass of the copolymer. In certain embodiments, the one or more ethylene oxide-propylene oxide monols ((b)(v)) have an EO content from 40-60% of the total mass of the copolymer. In certain embodiments, the one or more ethylene oxide-propylene oxide monols ((b)(iv)) are selected from random block copolymers (RBC) and block copolymers.

Not to be limited by theory, but it is believed that the one or more ethylene oxide-propylene oxide monols ((b)(v)) help with the compatibility of the PO-rich and EO-rich polyols as well as contributing to improved cell opening and air flow.

In certain embodiments, the low equivalent weight PO-rich polyol ((b)(i) and the high equivalent weight PO-rich polyol ((b)(iii)) may be combined to form a single PO-rich polyol component. In certain embodiments, the single PO-rich polyol component has a combined number average equivalent weight from 210 to 450 and preferably from 240 to 400. In certain embodiments, the single PO-rich polyol has a functionality from 2.4 to 4.0.

In certain embodiments, the single PO-rich polyol comprises at least 5 wt. %, 10 wt. %, 15 wt. %, 20 wt. %, 25 wt. %, 30 wt. %, 35 wt. %, 40 wt. %, or 45 wt. % of the total isocyanate reactive component (b). In certain embodiments, the single PO-rich polyol comprises up to 10 wt. %, 15 wt. %, 20 wt. %, 25 wt. %, 30 wt. %, 35 wt. %, 40 wt. %, 45 wt. %, or up to 50 wt. % of the total isocyanate reactive component (b). In certain embodiments, the single PO-rich polyol may comprise from 5% to 50% by weight or from about 15% to 35% by weight of the total isocyanate reactive component (b).

In certain embodiments, the isocyanate reactive component (b) may further comprise a chain extender ((b)(vi)). A chain extender is a material having two isocyanate-reactive groups per molecule. In either case, the equivalent weight per isocyanate-reactive group can range from about 30 to less than 100, and is generally from 30 to 75. The isocyanate-reactive groups are preferably aliphatic alcohol, primary amine or secondary amine groups, with aliphatic alcohol groups being particularly preferred. The chain extender ((b)(vi)) is typically used in small quantities such as up to 10 parts, especially up to 2 parts, by weight per 100 parts by weight of the total reactive system. In certain embodiments, the chain extender ((b)(vi)) content is from 0.015 to 5% by weight of the isocyanate reactive component (b). Examples of chain extenders include alkylene glycols such as ethylene glycol, 1,2- or 1,3-propylene glycol, 1,4-butanediol, 1,6-hexanediol, and the like; glycol ethers such as diethylene glycol.

In certain embodiments the isocyanate reactive component (b) comprises ((b)(i)) from 70% to 95% by weight of the isocyanate reactive component of one or more ethylene oxide (EO-rich) polyols having a combined number average equivalent weight from 200 to 800 and an ethylene oxide content from 40% to 65% by weight of the total mass of the EO-rich polyol and ((b)(ii)) from 10% to 30% by weight of the isocyanate reactive component of one or more high equivalent weight propylene oxide rich (PO-rich) polyols having a number average equivalent weight from 800 to 2,000.

In certain embodiments, the one or more EO-rich polyols ((b)(i)) (described above as ((b)(ii))) may comprise at least 70 wt. %, 75 wt. %, 80 wt. %, 85 wt. %, or 90 wt. % of the total isocyanate reactive component (b). In certain embodiments, the one or more EO-rich polyols ((b)(ii)) may comprise up to 75 wt. %, 80 wt. %, 85 wt. %, 90 wt. %, or 95 wt. %. The one or more EO-rich polyols ((b)(ii)) may comprise from 70 wt. % to 95 wt. % by weight or from 75 wt. % to 85 wt. % of the total isocyanate reactive component (b).

In certain embodiments, the one or more high equivalent weight PO-rich polyols ((b)(ii)) (described above as ((b)(iii))) may comprise at least 10 wt. %, 15 wt. %, 20 wt. %, or 25 wt. % of the total isocyanate reactive component (b). In certain embodiments, the one or more high equivalent weight PO-rich polyols ((b)(iii)) may comprise up to 15 wt. %, 20 wt. %, 25 wt. %, or up to 30 wt. % of the total isocyanate reactive component (b). In certain embodiments, the one or more high equivalent weight PO-rich polyols ((b)(iii)) may comprise from 10% to 30% by weight or from about 20% to 25% by weight of the total isocyanate reactive component (b).

In certain embodiments, the reaction system further comprises (c) a blowing agent. In certain embodiments, the blowing agent content is from 1% to 5% by weight of the total weight of the reaction system. In certain embodiments, the blowing agent content is from 1% to 2% by weight of the total weight of the reaction system. In certain embodiments, the blowing agent is water.

In certain embodiments, the reaction system further comprises (d) one or more catalysts. Catalysts are typically used in small amounts, for example, each catalyst being employed from 0.0015 to 5% by weight of the total reaction system. The amount depends on the catalyst or mixture of catalysts, the desired balance of the gelling and blowing reactions for specific equipment, the reactivity of the polyols and isocyanate as well as other factors familiar to those skilled in the art.

A wide variety of materials are known to catalyze polyurethane forming reactions, including tertiary amines; tertiary phosphines such as trialkylphosphines and dialkylbenzylphosphines; various metal chelates such as those which can be obtained from acetylacetone, benzoylacetone, trifluoroacetyl acetone, ethyl acetoacetate and the like, with metals such as Be, Mg, Zn, Cd, Pd, Ti, Zr, Sn, As, Bi, Cr, Mo, Mn, Fe, Co and Ni; acid metal salts of strong acids, such as ferric chloride, stannic chloride, stannous chloride, antimony trichloride, bismuth nitrate and bismuth chloride; strong bases such as alkali and alkaline earth metal hydroxides, alkoxides and phenoxides, various metal alcoholates and phenolates such as $Ti(OR)_4$, $Sn(OR)_4$ and $Al(OR)_3$, wherein R is alkyl or aryl, and the reaction products of the alcoholates with carboxylic acids, beta-diketones and 2-(N,N-dialkylamino) alcohols; alkaline earth metal, Bi, Pb, Sn or Al carboxylate salts; and tetravalent tin compounds, and tri- or pentavalent bismuth, antimony or arsenic compounds. Preferred catalysts include tertiary amine catalysts and organotin catalysts.

Examples of commercially available tertiary amine catalysts include: trimethylamine, triethylamine, N-methylmorpholine, N-ethylmorpholine, N,N-dimethylbenzylamine, N,N-dimethylethanolamine, N,N-dimethylaminoethyl, N,N,N',N'-tetramethyl-1,4-butanediamine, N,N-dimethylpiperazine, 1,4-diazobicyclo-2,2,2-octane, bis(dimethylaminoethyl) ether, triethylenediamine and dimethylalkylamines where the alkyl group contains from 4 to 18 carbon atoms. Mixtures of these tertiary amine catalysts are often used.

Examples of commercially available amine catalysts include NIAX™ A1 and NIAX™ A99 (bis(dimethylaminoethyl)ether in propylene glycol available from Momentive Performance Materials), NIAX™ B9 (N,N-dimethylpiperazine and N-N-dimethylhexadecylamine in a polyalkylene oxide polyol, available from Momentive Performance Materials), DABCO® 8264 (a mixture of bis(dimethylaminoethyl)ether, triethylenediamine and dimethylhydroxyethyl amine in dipropylene glycol, available from Air Products and Chemicals), DABCO 33LV® (triethylene diamine in dipropylene glycol, available from Air Products and Chemicals), DABCO® BL-11 (a 70% bis-dimethylaminoethyl ether solution in dipropylene glycol, available from Air Products and Chemicals, Inc), NIAX™ A-400 (a proprietary tertiary amine/carboxylic salt and bis (2-dimethylaminoethy)ether in water and a proprietary hydroxyl compound, available from Momentive Performance Materials); NIAX™ A-300 (a proprietary tertiary amine/carboxylic salt and triethylenediamine in water, available from Momentive Performance Materials); POLYCAT® 58 (a proprietary amine catalyst available from Air Products and Chemicals), POLYCAT® 5 (pentamethyl diethylene triamine, available from Air Products and Chemicals) and POLYCAT® 8 (N,N-dimethyl cyclohexylamine, available from Air Products and Chemicals).

Examples of organotin catalysts are stannic chloride, stannous chloride, stannous octoate, stannous oleate, dimethyltin dilaurate, dibutyltin dilaurate, other organotin compounds of the formula $SnR_n(OR)_{4-n}$, wherein R is alkyl or aryl and n is 0-2, and the like. Organotin catalysts are generally used in conjunction with one or more tertiary amine catalysts, if used at all. Commercially available organotin catalysts of interest include KOSMOS® 29 (stannous octoate from Evonik AG), DABCO® T-9 and T-95 catalysts (both stannous octoate compositions available from Air Products and Chemicals).

In certain embodiments, the reaction system further comprises (e) one or more surfactants to help stabilize the foam as it expands and cures. Surfactants are typically used in small amounts, for example, each catalyst being employed from about 0.0015 to about 5% by weight of the total reaction system. The amount depends on the surfactants or mixture of surfactants, as well as other factors familiar to those skilled in the art.

Examples of surfactants include nonionic surfactants and wetting agents such as those prepared by the sequential addition of propylene oxide and then ethylene oxide to propylene glycol, solid or liquid organosilicones, and polyethylene glycol ethers of long chain alcohols. Ionic surfactants such as tertiary amine or alkanolamine salts of long chain alkyl acid sulfate esters, alkyl sulfonic esters and alkyl arylsulfonic acids may also be used. The surfactants prepared by the sequential addition of propylene oxide and then ethylene oxide to propylene glycol are preferred, as are the solid or liquid organosilicones. Examples of useful organosilicone surfactants include commercially available polysiloxane/polyether copolymers such as TEGOSTAB® (trademark of Evonik AG) B-8462, B-8404 and B-8871, and DC-198 and DC-5043 surfactants, available from Dow Corning, and NIAX™ L-627, NIAX™ L-620, and NIAX™ L-618 available from Momentive Performance Materials. Surprisingly, NIAX™ L-620 surfactant provides improved air flow in comparison to other silicone surfactants which enables the use of one or more PO-rich polyols having a higher average equivalent weight.

In a further embodiment, to improve processing and to permit the use of higher isocyanate indices, additional additives such as those described in publication WO 20008/021034, the disclosure of which is incorporated herein by reference, may be added to the reaction mixture. Such additives include 1) alkali metal or transition metal salts of carboxylic acids; 2) 1,3,5-tris alkyl- or 1,3,5-tris (N,N-dialkyl amino alkyl)-hexahydro-s-triazine compounds; and 3) carboxylate salts of quaternary ammonium compounds. When used, such additives are generally used in an amount from about 0.01 to 1 part per 100 total polyol. The additional additive is generally dissolved in at least one other component of the reaction mixture. It is generally not preferred to dissolve it in the polyisocyanate.

Various additional components may be included in the viscoelastic foam formulation. These include, for example, crosslinkers, plasticizers, fillers, smoke suppressants, fragrances, reinforcements, dyes, colorants, pigments, preservatives, odor masks, physical blowing agents, chemical blowing agents, flame retardants, internal mold release agents, biocides, antioxidants, UV stabilizers, antistatic agents, thixotropic agents, adhesion promoters, cell openers, and combination of these.

The foamable composition may contain a cell opener or crosslinker. When these materials used, they are typically used in small quantities such as up to 10 parts, especially up to 2 parts, by weight per 100 parts by weight of the total reactive system. A cross-linker is a material having, on average, greater than two isocyanate-reactive groups per molecule. In either case, the equivalent weight per isocyanate-reactive group can range from about 30 to less than 100, and is generally from 30 to 75. The isocyanate-reactive groups are preferably aliphatic alcohol, primary amine or secondary amine groups, with aliphatic alcohol groups being particularly preferred. Examples of chain extenders and crosslinkers include alkylene glycols such as ethylene glycol, 1,2- or 1,3-propylene glycol, 1,4-butanediol, 1,6-hexanediol, and the like; glycol ethers such as diethylene glycol.

One or more fillers may also be present in the viscoelastic foam formulation. A filler may help modify the composition's rheological properties in a beneficial way, reduce cost and impart beneficial physical properties to the foam. Suitable fillers include particulate inorganic and organic materials that are stable and do not melt at the temperatures encountered during the polyurethane-forming reaction. Examples of suitable fillers include kaolin, montmorillonite, calcium carbonate, mica, wollastonite, talc, high-melting thermoplastics, glass, fly ash, carbon black titanium dioxide, iron oxide, chromium oxide, azo/diazo dyes, phthalocyanines, dioxazines and the like. The filler may impart thixotropic properties to the foamable polyurethane composition. Fumed silica is an example of such a filler.

Reactive particles may also be included in the reaction system to modify the properties of the viscoelastic foam. Such reactive systems include copolymer polyols such as those containing styrene/acrylonitrile (SAN), polyharnstoff dispersion (PHD) polyols and polyisocyanate polyaddition products (PIPA), for instance as taught in Chemistry and Technology of Polyols for Polyurethanes, Rapra Technology Limited (2005) pp 185-227.

When used, fillers advantageously constitute from about 0.5 to about 30%, especially about 0.5 to about 10%, by weight of the reaction system.

Although no additional blowing agent (other than the water) in the foamable polyurethane composition is generally used, it is within the scope of the embodiments described herein to include an additional physical or chemical blowing agent. The physical blowing agents can be, but are not limited to, liquid carbon dioxide ($CO_2$), supercritical $CO_2$ and various hydrocarbons, fluorocarbons, hydrofluorocarbons, chlorocarbons (such as methylene chloride), chlorofluorocarbons and hydrochlorofluorocarbons. Chemical blowing agents are materials that decompose or react (other than with isocyanate groups) at elevated temperatures to produce carbon dioxide and/or nitrogen.

The VE foam can be prepared in a so-called slabstock process, or by various molding processes; refer to "Flexible Polyurethane Foams" by R. Herrington, ed., 1999. In a slabstock process, the components are mixed and poured into a trough or other region where the formulation reacts, expands freely in at least one direction, and cures. Slabstock processes are generally operated continuously at commercial scales.

In a slabstock process, the various components are introduced individually or in various subcombinations into a mixing head, where they are mixed and dispensed. Component temperatures are generally in the range of from 15 to 35° C. prior to mixing. The dispensed mixture typically expands and cures without applied heat. In the slabstock process, the reacting mixture expands freely or under minimal restraint (such as may be applied due to the weight of a cover sheet or film).

It is also possible to produce the viscoelastic foam in a molding process, by introducing the reaction mixture into a closed mold where it expands and cures. Often times, the mold itself is pre-heated to a temperature above ambient conditions. Such pre-heating of the mold can lead to faster cycle time.

Viscoelastic foam made in accordance with the embodiments described herein are useful in a variety of packaging and cushioning applications, such as mattresses, including mattress toppers, pillows, packaging, bumper pads, sport and medical equipment, helmet liners, pilot seats, earplugs, and various noise and vibration dampening applications. The noise and vibration dampening applications are of particular importance for the transportation industry, such as in automotive applications.

The following examples are provided to illustrate embodiments of the invention, but are not intended to limit the scope thereof. All parts and percentages are by weight unless otherwise indicated.

A description of the raw materials used in the examples is as follows.

Polyol A is a 3 functional, glycerin initiated, 336 equivalent weight all propylene oxide polyether polyol with a hydroxyl number of 167 commercially available from The Dow Chemical Company under the trade designation VORANOL® 3150.

Polyol B is a poly ethylene oxide—co-propylene oxide copolymer triol (glycerin initiated), with 60 wt. % of ethylene oxide in the alkylene oxide feed, a hydroxyl number of 168, and a primary hydroxyl content of approximately 38%.

Polyol C is a 3 functional, glycerin initiated polyoxyethylene-polyoxypropylene mixed feed polyol (8 wt. % EO) having an equivalent weight of approximately 994 with a hydroxyl number of 56 available from The Dow Chemical Company under the trade designation VORANOL® 3010 polyol.

Polyol D is a polyoxyalkylene copolymer polyol (CPP) containing dispersed polymer particles obtained by in-situ polymerization of acrylonitrile and styrene with a hydroxyl number of 22 commercially available from the Dow Chemical Company under the trade designation VORALUX™ HL 431.

Polyol E is a 6.9 functional, polyoxyethylene-polyoxypropylene mixed feed polyol (75 wt. % EO) having a hydroxyl number of 31, available from The Dow Chemical Company under the trade designation VORANOL® 4053.

Polyol F is a 3 functional, glycerine-initiated, capped polyoxyethylene-polyoxypropylene polyol (14% EO) having a hydroxyl number of 34, available from The Dow Chemical Company under the trade designation VORANOL® 4701.

Polyol G is a 3 functional, glycerine-initiated all propylene oxide polyether polyol with a hydroxyl number of 238, available from The Dow Chemical Company under the trade designation VORANOL® 2070

Monol is a poly propylene oxide—co-ethylene oxide monol, commercially available from The Dow Chemical Company under the trade designation UCON™ 50-HB-100.

Silicone A is a silicone surfactant used for viscoelastic MDI foams, commercially available from Momentive Performance Materials as NIAX™ L-618 surfactant (a moderate surfactant designed for use with MDI foams).

Silicone B is a silicone surfactant used for the stabilization of conventional slabstock foam, commercially available from Momentive Performance Materials as NIAX™ L-620 surfactant (a high performance alkyl-pendant type organosilicone surfactant designed for use in conventional flexible slabstock foams).

Amine catalyst A is a 70% bis-dimethylaminoethyl ether solution in dipropylene glycol, commercially supplied as DABCO® BL-11 catalyst available from Air Products and Chemicals, Inc.

Amine catalyst B is a 33% solution of triethylene diamine in dipropylene glycol, available commercially from Air Products and Chemicals as DABCO 33LV®.

Tin Catalyst is a stannous octoate catalyst, also known as tin(II) 2-ethylhexanoate, available commercially from Evonik as KOSMOS® 29.

Polymeric MDI (PMDI) is polymeric MDI with a functionality of 2.2, commercially available as PAPI™ PB-219 from The Dow Chemical Company.

PMDI-2 is polymeric MDI with a functionality of 2.3, commercially available as PAPI™ 94 from The Dow Chemical Company.

Test Methods

Unless otherwise specified, the foam properties are measured by ASTM D3574.

EXAMPLE 1 TO 12 AND CONTROL (C1 to C6).

The samples in this study were made through box foaming using a 38 cm ×38 cm×24 cm wooden box lined with clear plastic film lining. A high shear 16-pin (4 pins each in four radial directions) mixer at high rotation speed was used. The pin mixer head was designed such that the ends of the pins are 1 cm clear of the wall of the 1-gallon cylindrical mixing cup. The components in the formulation with the exception of the tin catalyst and isocyanate were mixed first for 15 seconds at 2,400 rpm. Then the stannous octoate catalyst was added and immediately mixed for another 15 seconds (2,400 rpm). Finally the isocyanate was added to the mixture and immediately mixed for another 4 seconds (3,000 rpm). The entire mixture was poured into the box lined with plastic film. The blow off time was measured from the moment the final mixing step (the step with the addition of isocyanate) starts. Once foaming was complete, the foam was further allowed to cure overnight under the hood. Foam sample walls were discarded and the remaining samples were characterized for mechanical and chemical analysis. Eleven formulations were studied and the formulations and mechanical properties are provided in Table 1.

Foam samples were characterized according to ASTM D 3574. Table 1 describes the formulations explored and the mechanical properties observed for such formulations. The comparative example is labeled as C#1 and formulations of the embodiments described herein are labeled as #1-#12. Comparative example C#1 shows that compression set (39.7%) and air flow properties (0.37 l/s) of MDI based foams produced with an all PO polyol (Polyol A) and a copolymer polyol (Polyol D) is very poor.

EXAMPLES 13 TO 16

A molded foam article was made using a high pressure impingement A-B mixer, Cannon A-40, commercially available from a foaming equipment manufacturer, Cannon. A target mix-head pressure was about 1,500 psi for both isocyanate ("A") side and polyol ("B") side. The isocyanate tank only contains the polyisocyanate, and the polyol tank contains all the polyols, surfactants, water and catalyst. The mixture was dispensed into a heated aluminum mold with dimensions of 15"×15"×4.5", with initial temperature set at 49 degrees Celsius ±10 degrees Celsius, with each shot completed in 5-7 seconds depending on the throughput. As shown in Table 2, very soft molded foam articles with good recovery performance were obtained."

The inventors have found that a significant improvement of compression set and airflow properties for a viscoelastic polyurethane foam could be achieved by using a significant amount of EO-rich polyol (Polyol B) in the reaction system. Formulation #1 demonstrates the use of a copolymer polyol and a chain extender. Formulations #2 to 4 demonstrate the use of a conventional high equivalent weight PO-rich polyol (Polyol C) with the use of chain extender. Formulations #5 and 6 demonstrate the use of monol. Formulations # 7 to 11 demonstrate the use of the low equivalent weight PO-rich polyol (Polyol A), the EO rich polyol (Polyol B), and the high equivalent weight polyol (Polyol C) without the use of a copolymer polyol, chain extender or monol. The examples demonstrate excellent compression set properties, 90% CS <3% and the foam are open, most has high air flow >1 l/s.

TABLE 1

Formulations And Physical Properties.

| Formulation | C1 | 1 | 2 | 3 | 4 | 5 | 6 | 7 | 8 | 9 | 10 | 11 | 12 |
|---|---|---|---|---|---|---|---|---|---|---|---|---|---|
| Polyol A | 80 | 20 | 30 | 25 | 20 | 25 | 25 | 25 | 25 | 20 | 17.5 | 15 | |
| Polyol B | | 60 | 50 | 55 | 60 | 50 | 45 | 55 | 50 | 55 | 57.5 | 60 | 75 |
| Polyol C | | | 20 | 20 | 20 | 20 | 20 | 20 | 25 | 25 | 25 | 25 | 25 |
| Polyol D | 20 | 20 | | | | | | | | | | | |

TABLE 1-continued

Formulations And Physical Properties.

| Formulation | C1 | 1 | 2 | 3 | 4 | 5 | 6 | 7 | 8 | 9 | 10 | 11 | 12 |
|---|---|---|---|---|---|---|---|---|---|---|---|---|---|
| Monol | | | | | | 5 | 10 | | | | | | |
| Chain Extender | 0.75 | 0.75 | 0.75 | 0.75 | 0.75 | 0.75 | 0.75 | | | | | | |
| Water | 2 | 2 | 2 | 2 | 2 | 2 | 2 | 2 | 2 | 2 | 2 | 2 | 2 |
| Silicone surfactant A | 0.8 | 0.8 | 0.8 | 0.8 | 0.8 | 0.8 | 0.8 | 0.8 | 0.8 | 0.8 | 0.8 | 0.8 | |
| Silicone surfactant B | | | | | | | | | | | | | 1 |
| Amine catalyst 1 | 0.2 | 0.2 | 0.15 | 0.15 | 0.15 | 0.15 | 0.15 | 0.15 | 0.15 | 0.15 | 0.15 | 0.15 | 0.15 |
| Amine catalyst 2 | 0.07 | 0.07 | 0.05 | 0.05 | 0.05 | 0.05 | 0.05 | 0.05 | 0.05 | 0.05 | 0.05 | 0.05 | 0.05 |
| Tin catalyst | 0.05 | 0.05 | 0.05 | 0.05 | 0.05 | 0.05 | 0.05 | 0.05 | 0.05 | 0.05 | 0.05 | 0.05 | 0.05 |
| Total | 103.9 | 103.9 | 103.8 | 103.8 | 103.8 | 103.8 | 103.8 | 103.1 | 103.1 | 103.1 | 103.1 | 103.1 | 103.3 |
| Polymeric MDI | 50.06 | 47.4 | 48.2 | 48.2 | 48.2 | 47.74 | 52.3 | 46.61 | 45.65 | 45.65 | 45.65 | 45.65 | 45.8 |
| Total A + B | 153.9 | 151.3 | 152.0 | 152.0 | 152.0 | 151.5 | 156.1 | 149.7 | 148.7 | 148.7 | 148.7 | 148.7 | 149.1 |
| Iso Index | 78 | 75 | 75 | 75 | 75 | 75 | 83 | 75 | 75 | 75 | 75 | 75 | 75 |
| Airflow (l/s) | 0.37 | 1.09 | 0.76 | 1.37 | 1.89 | 0.93 | 0.078 | 1.07 | 1.48 | 2.33 | 2.42 | 2.35 | 2.68 |
| 90% CT (%) | 39.7 | 1.2 | 1.9 | 1.3 | 1.1 | 1.9 | 2.5 | 1.3 | 1.6 | 1.1 | 1.1 | 0.9 | 1.2 |
| Density (kg/m³) | 51.2 | 52.4 | 50.9 | 50.9 | 51.3 | 51.1 | 49.7 | 47.9 | 48.0 | 48.8 | 48.4 | 48.2 | 47.9 |
| Recovery time (s) | 3 | 2 | 2 | 2 | 2 | 3 | 6 | 2 | 3 | 2 | 2 | 2 | |
| Resiliency (%) | 8 | 3 | 1 | 1 | 2 | 5 | 2 | 3 | 2 | 2 | 3 | 3 | 4 |
| Tear Strength (N/m) | 175 | 136 | 135 | 128 | 149 | 114 | 150 | 128 | 173 | 161 | 169 | 171 | 114 |
| Elongation (%) | 95 | 113 | 139 | 143 | 134 | 151 | 141 | 141 | 178 | 188 | 195 | 191 | |
| 25% IFD (lbf) | 23 | 14 | 11 | 10 | 10 | 8.5 | 13 | 11 | 8 | 8 | 7 | 8 | |
| 65% IFD (lbf) | 60 | 26 | 22 | 20 | 21 | 17 | 26 | 22 | 16 | 16 | 16 | 17 | |
| 40% CFD (kPa) | | | | | | | | | | | | | 0.9 |

TABLE 2

Formulation and Physical Properties.

| | Ex. 13 | Ex. 14 | Ex. 15 | Ex. 16 |
|---|---|---|---|---|
| Formulation | | | | |
| Polyol A | 15 | 20 | 20 | 0 |
| Polyol B | 45 | 50 | 50 | 60 |
| Polyol E | 25 | 15 | 15 | 5 |
| Polyol F | 15 | 15 | 15 | 20 |
| Polyol G | 0 | 0 | 0 | 15 |
| Water | 2.7 | 2.5 | 2.7 | 2.6 |
| Silicone A | 1 | 1 | 1 | 0.7 |
| Amine A | 0.15 | 0.15 | 0.2 | 0.15 |
| Amine B | 0.3 | 0.2 | 0.2 | 0.27 |
| Total | 89.15 | 83.85 | 84.10 | 103.72 |
| Index | 60 | 60 | 65 | 70 |
| PMDI-2 | 39.44 | 39.59 | 44.78 | 35.45 |
| Grams | 1150 | 1150 | 1050 | 1400 |
| Wt Foam | 937 | 922 | 855 | 807 |
| Properties | | | | |
| 90% Comp. | 8 | n/a | n/a | n/a |
| 50% Comp. | n/a | 30 | 2 | 4 |
| Ten. Str. | 4.3 | 3.0 | 4.8 | n/a |
| % Elong. | 86 | 82 | 86 | n/a |
| Tear Str. | 0.35 | 0.36 | 0.48 | 0.60 |
| Resil. | n/a | n/a | n/a | n/a |
| Air Flow | 0.88 | 0.47 | n/a | 1.47 |
| Density | 3.7 | 3.6 | 3.5 | 3.2 |
| Recovery Time (Sec) | 2 | 3 | 3 | 2 |
| CFD 25% | 1.9 | 1.7 | 1.9 | 2.0 |
| CFD 65% | 3.5 | 3.1 | 3.5 | 3.4 |
| CFD 75% | 5.9 | 5.3 | 5.8 | 5.6 |
| Support Factor(%) | 1.80 | 1.86 | 1.83 | 1.76 |
| Comments | | very slow | | |

While the foregoing is directed to embodiments of the invention, other and further embodiments of the invention may be devised without departing from the basic scope thereof.

What is claimed is:

1. A reaction system for preparation of a viscoelastic polyurethane foam comprising:
   (a) an organic polyisocyanate; and
   (b) an isocyanate reactive component comprising:
      (i) from 10 to up to 45% by weight of the isocyanate reactive component of one or more low equivalent weight propylene oxide rich (PO-rich) polyols having a combined number average equivalent weight from 200 to 500 and a propylene oxide content of at least 70% by weight;

(ii) from 45 to up to 80% by weight of the isocyanate reactive component of one or more ethylene oxide (EO-rich) polyols having a combined number average equivalent weight from 200 to 800 and an ethylene oxide content of at least 45% and up to 70% by weight, and the one or more EO-rich polyols having a primary hydroxyl content of at least 35% and less than 50%, based on the total hydroxyl content of the one or more EO-rich polyols;

and at least one of (iii) from 10 to 30% by weight of the isocyanate reactive component of one or more high equivalent weight propylene oxide rich (PO-rich) polyols having a number average equivalent weight from 800 to 2,000 and a propylene oxide content of at least 70% by weight; and (iv) from 10 to 40% by weight of the isocyanate reactive component of one or more propylene oxide co-polymer polyols containing styrene-acrylonitrile.

2. The reaction system of claim 1, wherein the one or more EO-rich polyols have an ethylene oxide content from 45% to 60% of the total mass of the EO-rich polyol.

3. The reaction system of claim 1, wherein the isocyanate reactive component further comprises:

(v) from 5 to 10% by weight of the isocyanate reactive component of one or more ethylene oxide-propylene oxide monols having a combined number average equivalent weight from 300 to 800.

4. The reaction system of claim 3, wherein the isocyanate reactive component further comprises:

(vi) a chain extender.

5. The reaction system of claim 4, further comprising:

(c) water; and (d) a catalyst component.

6. The reaction system of claim 5, further comprising:

(e) an organosilicone surfactant.

7. The reaction system of claim 3, wherein the one or more ethylene oxide-propylene oxide monols have a functionality between 1 and 2 and a combined number average equivalent weight from 400 to 600.

8. The reaction system of claim 7, wherein the one or more ethylene oxide-propylene oxide monols have an ethylene oxide concentration that is between 30-70% by weight of the total mass of the monol.

9. The reaction system of claim 1, wherein the ethylene oxide content is from 55% to 65% by weight of the total mass of the one or more EO-rich polyols.

10. A method of preparing a viscoelastic foam, comprising: forming reaction components, comprising:

an organic polyisocyanate;

an isocyanate reactive component comprising:

one or more low equivalent weight propylene oxide rich (PO-rich) polyols having a combined number average equivalent weight from 200 to 500, comprising from 10 to up to 45% by weight of the isocyanate reactive component, and having a propylene oxide content of at least 70% by weight;

one or more ethylene oxide (EO-rich) polyols having a combined number average equivalent weight from 200 to 800, an ethylene oxide content of at least 45% and up to 70% by weight, and comprising from 45 to up to 80% by weight of the isocyanate reactive component, and the one or more EO-rich polyols having a primary hydroxyl content of at least 35% and less than 50%, based on the total hydroxyl content of the one or more EO-rich polyols;

and at least one of one or more high equivalent weight PO-rich polyols having a number average equivalent weight from 800 to 2,000, having a propylene oxide content of at least 70% by weight, and comprising from 10 to 30% by weight of the isocyanate reactive component; and one or more propylene oxide co-polymer polyols containing styrene-acrylonitrile and comprising from 10 to 40% by weight of the isocyanate reactive component;

water; and a catalyst component; and combining the reaction components at conditions sufficient to form a viscoelastic polyurethane foam.

11. The method of claim 10, wherein the isocyanate reactive component further comprises:

(v) from 5 to 10% by weight of the isocyanate reactive component of one or more ethylene oxide-propylene oxide monols having a combined number average equivalent weight from 300 to 800.

12. The method of claim 11, wherein the isocyanate reactive component further comprises a chain extender.

13. The method of claim 12, wherein the reaction components further comprises an organosilicone surfactant.

14. The method of claim 13, wherein the one or more ethylene oxide-propylene oxide monols have a functionality between 1 and 2 and a combined number average equivalent weight from 400 to 600.

15. The method of claim 14, wherein the one or more ethylene oxide-propylene oxide monols have an ethylene oxide concentration that is between 30-70% by weight of the total mass of the one or more monols.

16. The method of claim 15, wherein the one or more ethylene oxide-propylene oxide monols have an ethylene oxide concentration that is between 40-60% by weight of the total mass of the one or more monols.

17. The reaction system of claim 1, wherein the one or more EO-rich polyols have a primary hydroxyl content of at least 37% and less than 50%.

18. The reaction system of claim 17, wherein the combined number average equivalent weight of the one or more EO-rich polyols is from 250 to 400 and the ethylene oxide content of the one or more EO-rich polyols is from 55% to 65% by weight of the total mass of the one or more EO-rich polyols.

19. The reaction system of claim 18, wherein the isocyanate reactive component includes at least 15% and up to 35% by weight of the one or more low equivalent weight PO-rich polyols and from 45% and up to 65% by weight of the one or more EO-rich polyols.

* * * * *